US005768364A

United States Patent [19]
Karnowski et al.

[11] Patent Number: 5,768,364
[45] Date of Patent: Jun. 16, 1998

[54] SOFTWARE SPEAKERPHONE SYSTEM AND METHOD OF OPERATING A SPEAKERPHONE

[75] Inventors: Mark J. Karnowski, Westminster; Frank Sacca, West Covina; Catherine Tsang, Monterey Park, all of Calif.

[73] Assignee: Casio PhoneMate, Inc., Torrance, Calif.

[21] Appl. No.: 797,853

[22] Filed: Feb. 10, 1997

Related U.S. Application Data

[63] Continuation of Ser. No. 454,689, May 31, 1995, abandoned.

[51] Int. Cl.[6] ................................................. H04M 9/00
[52] U.S. Cl. ...................... 379/388; 379/389; 379/390; 379/420
[58] Field of Search ..................... 379/388, 389, 379/390, 391, 392, 402, 406, 410, 420, 347

[56] References Cited

U.S. PATENT DOCUMENTS

| | | | |
|---|---|---|---|
| 3,725,585 | 4/1973 | Moniak et al. | 379/389 |
| 4,513,177 | 4/1985 | Nishino et al. | 379/390 |
| 4,555,596 | 11/1985 | Blomley | 379/389 |
| 4,629,829 | 12/1986 | Phul et al. | 379/390 |
| 4,715,062 | 12/1987 | Korsky et al. | 379/390 |
| 4,715,063 | 12/1987 | Haddad et al. | 379/390 |
| 4,741,018 | 4/1988 | Potratz et al. | 379/58 |
| 4,879,745 | 11/1989 | Arbel | 379/390 |
| 5,014,294 | 5/1991 | Kromenaker et al. | 379/58 |
| 5,075,687 | 12/1991 | Chen et al. | 379/390 |
| 5,187,741 | 2/1993 | Erving et al. | 379/388 |
| 5,430,796 | 7/1995 | Komoda et al. | 379/390 |
| 5,471,528 | 11/1995 | Ressor | 379/390 |

FOREIGN PATENT DOCUMENTS

2 147 175  5/1985  United Kingdom .

*Primary Examiner*—Krista Zele
*Assistant Examiner*—Jacques M. Saint-Surin
*Attorney, Agent, or Firm*—Frishauf, Holtz, Goodman, Langer & Chick

[57] ABSTRACT

In a speakerphone, which operates under software control, transmit and receive signal levels are sampled and compared against one another, with hysteresis, to enable one of two speakerphone modes of operation—either a transmit mode or a receive mode. A single peak detector is multiplexed to sense the transmit and receive signal levels. Fixed attenuators are switched into either the receive signal path or into the transmit signal path, depending upon the current speakerphone operation mode. Signal compression is used to provide for improved mode determination over a wide dynamic range. The level detection and/or attenuation may be performed in software. The speakerphone functions are readily implemented using standard line interfaces and control circuitry. Automatic gain control in the receive mode ensures a constant level of signals at the speakerphone loudspeaker, regardless of telephone line conditions.

41 Claims, 4 Drawing Sheets

SOFTWARE SPEAKERPHONE SYSTEM AND METHOD OF OPERATING A SPEAKERPHONE

This application is a Continuation of application Ser. No. 08/454,689, filed May 31, 1995 now abandoned.

TECHNICAL FIELD OF THE INVENTION

The invention relates to telephone communications systems, more particularly to telephone terminal devices for connecting to a switched telephone network and, more particularly, to speakerphone devices and systems.

BACKGROUND OF THE INVENTION

"Speakerphones", or telephone terminal devices (telephones) which permit a user (local party) to converse over a telephone network with another (distant, also called or calling) party without the use of a handset, are common in today's market place. Such use of a telephone is also sometimes loosely referred to as "hands-free" operation of the telephone. Such devices usually incorporate a speaker and a microphone, much as a "normal" telephone incorporates a speaker and a microphone in an earpiece and mouthpiece, respectively, of a handset. However, in the case of a speakerphone device, the speaker and microphone are positioned such that they need not be held by the user.

Hereinafter, to avoid possible confusion between the use of the term "speaker", referring to an audio transducer for converting electrical signals into sound energy, and the term "speaker" as a user of a telephone who is speaking, the audio transducer will be referred to as a "loudspeaker". Further, the portion of the telephone (or speakerphone) which transmits electrical signals from the microphone over the telephone network will be referred to as a "transmit side" or "transmit channel" of the telephone for producing a "transmit signal" on the telephone network, and the portion of the telephone which converts a "receive signal" from the telephone network into an audible sound produced by the loudspeaker will be referred to as the "receive side" or "receive channel" of the telephone.

A speakerphone is generally intended to produce an audio volume level from the loudspeaker sufficient to be heard (audible to a user) at some distance from the speakerphone, unlike a conventional telephone wherein the volume level produced by the loudspeaker in the handset is such that it can only be heard clearly when the earpiece of the handset is placed very close (e.g., less than one inch) to the ear of the user.

Virtually all telephones incorporate a "sidetone" (or "hybrid") network which is intended to prevent at least a portion of the audio signal provided by the microphone (this portion of the signal is commonly known as the "sidetone" signal) from feeding into the loudspeaker. The term "sidetone gain" refers to how much of the audio signal from the microphone remains in the loudspeaker output (received signal). In a conventional telephone handset, the audio levels produced by the loudspeaker in the earpiece are generally quite low and are often almost completely shielded from the microphone in the mouthpiece by the user's ear.

One of the most significant problems in designing telephones which incorporate a "speakerphone" mode of operation is preventing audio feedback (commonly known as howling or squealing) that results from a regenerative coupling between the microphone and the loudspeaker due to the presence of a sidetone signal component in the audio signal produced by the loudspeaker. This coupling results when the speakerphone's microphone picks up sound produced by the loudspeaker and transmits it back to a telephone line, where a portion of that signal is sent back to the loudspeaker as sidetone, only to be acoustically coupled to the microphone again. If the sidetone gain of the speakerphone is sufficient that the sound level of the "repeated" sidetone signal produced by the loudspeaker is as great as or greater than that of the original sound that produced the sidetone signal, the speakerphone will howl. Hereinafter, the regenerative signal path from the microphone through the sidetone network out the loudspeaker and back into the microphone will be referred to as a "sidetone loop" and the regenerative gain of the sidetone loop will be referred to as the "sidetone loop gain".

Most commonly available speakerphones deal with the audio feedback problem by incorporating a switching mechanism whereby signals from either the transmit side or the receive side of the speakerphone are attenuated sufficiently to prevent howling. The determination of which side of the speakerphone will be attenuated is based upon whether the user of the speakerphone is currently talking or listening. The attenuated side or channel of the telephone (i.e., the receive channel or the transmit channel) is sometimes referred to as the "off" channel and, accordingly, the unattenuated side or channel is referred to as the "on" channel.

One problem which can occur in speakerphone designs is rapid oscillation between the transmit mode and the receive mode when the transmit signal level and receive signal level are very close to one another (for example, when both the local and distant parties are silent). Oscillation of this type can result in an unpleasant and undesirable switching noise.

Another problem in some speakerphone designs is related to the manner in which the speakerphone switches from transmit mode to receive mode, and vice versa. If the switching mechanism changes at an inappropriate time (e.g., due to slow switching), there can be a somewhat disturbing "chopping" effect of the audio signal, effectively briefly cutting off transmission or reception of signals at the speakerphone. This problem is complicated somewhat by the relatively wide dynamic range of the transmit and receive signals (typically a 40 db dynamic range for the receive signal).

Typically, a speakerphone device determines when to switch from transmit mode (when the user is speaking into the microphone and the receive signal is attenuated) to receive mode (when the distant party is speaking and being heard over the loudspeaker and the transmit signal is attenuated) by comparing the relative levels of the transmit signal and receive signal, and using this information to make the switching decision.

Speakerphone systems are well known in the art. One speakerphone system is described in U.S. Pat. No. 4,513,177 to Nishino (hereinafter, "NISHINO"). NISHINO addresses the problem of howling by using variable attenuators for the transmit (Tx) and the receive (Rx) signals. By measuring the signals at various points in the sidetone loop, the NISHINO system continuously calculates the sidetone loop gain and an acoustic gain. Once the acoustic and side tone gains are determined, the system adjusts the attenuators so that the sidetone loop gain is less than unity (a gain of greater than unity will produce the howling effect).

The NISHINO technique determines when to switch from transmit to receive, and vice-versa, by using separate detectors for ascertaining the receive signal level and the transmit signal level, resulting in an additional "idle" mode when neither the local party nor the distant party is talking. The result of the determination produces control signals which are used to control the variable attenuators. NISHINO's variable attenuators reduce the audible effects of oscillation and provide a partial solution to the problem of slow switching, but only if the speakerphone is in an "idle" mode (i.e., neither the local party nor the distant party is talking). The NISHINO technique imposes a lag when the time from when the local local party stops talking to when the distant party begins talking is short (short "turnaround time"), because the NISHINO technique is much quicker in switching from the "idle" mode to receive mode or transmit mode than from transmit mode to receive mode (or vice versa).

A principal shortcoming of the NISHINO technique is that it is complicated and hard to adjust. Expensive variable attenuators and a complex control circuit that is capable of making the gain calculations quickly and accurately are required in order to realize the technique. Further, NISHINO's use of separate peak detectors for the transmit signal and for the receive signal add cost to the system.

Another prior-art speakerphone system is described in U.S. Pat. No. 3,725,585 to MONIAK (hereinafter "MONIAK"). MONIAK employs a two-state (transmit-mode/receive-mode) approach, with fixed attenuators for the transmit (Tx) and receive (Rx) signals to prevent howling. The MONIAK technique makes its determination of when to switch from transmit mode to receive mode, or vice-versa, by straight comparison of the transmit signal and the receive signal. The system switches to the appropriate mode depending on which signal is larger.

In order to prevent rapid oscillation, MONIAK introduces gain to the "on" channel. This introduction of additional gain requires additional attenuation of the "off" channel to ensure that the attenuation constant remains the same. Hence, there is a considerable difference between the "on" and "off" channels. This results in the perception of a "dead" "off" channel, due to excessive sidetone signal attenuation.

U.S. Pat. No. 4,555,596 to BLOMLEY (hereinafter "BLOMLEY") describes a speakerphone that, in a manner similar to NISHINO, uses variable attenuators and a multiple-state approach. BLOMLEY, introduces a delay into the switching of the transmit side and receive side attenuators to prevent rapid oscillation. This delay is independent of the relative amplitudes of the transmit and receive signals. Therefore, relatively loud (high level) signals and relatively soft (low level) signals are treated equally.

In BLOMLEY, the only discussion relating to switching and oscillation is in the presentation of the aforementioned delay in the switching of the attenuators. This delay can potentially cause "chopping" of audio signals. Further, BLOMLEY employs separate analog to digital (A/D) converters for the receive and transmit signals. BLOMLEY does not disclose a technique for handling the wide dynamic range of signals that can occur on a telephone line. Simply adding bits of resolution to the A/D (analog-to-digital) converters as a means of increasing sensitivity would be very costly, as the complexity of an A/D converter increases significantly with each added bit.

Evidently, there is a need for a speakerphone design which addresses the aforementioned problems of high-speed oscillation between modes, howling, and "chopping" of the audio signal, at an effective cost, and without the shortcomings of the aforementioned prior-art techniques.

SUMMARY OF THE INVENTION

It is therefore a general object of the present invention to provide an improved speakerphone system.

It is a further object of the present invention to provide a technique for preventing howling in a speakerphone.

It is a further object of the present invention to provide a technique which prevents high-speed oscillation between a transmit mode and a receive mode in a speakerphone.

It is a further object of the present invention to accomplish the foregoing objects in a manner which minimizes "chopping" of the audio signal.

It is a further object of the present invention to provide techniques for accomplishing the foregoing objects at low cost.

It is a further object of the present invention to provide techniques which are readily adaptable to software control.

It is a further object of the present invention to provide techniques for accomplishing the foregoing objects while providing sensitivity to transmit signals and receive signals over a wide dynamic range.

According to the invention, a speakerphone device (or system) is provided by connecting a digital controller, a transmit amplifier, two switchable attenuators, a microphone amplifier, a loudspeaker amplifier and a receive amplifier to a conventional telephone line interface connected to a telephone line. The microphone amplifier provides a transmit audio signal from a microphone. The digital controller monitors, via a level detector means, the relative levels of the receive signal coming from the telephone line and a transmit audio signal for transmission over the telephone line. Based upon the relative levels of the receive signal and the transmit audio signal, one of two speakerphone modes is selected—either the transmit mode or the receive mode. The currently selected speakerphone mode affects the determination process, such that there is hysteresis in the comparison of the levels.

One of the switchable attenuators is connected between the receive amplifier and the loudspeaker amplifier. The other switchable attenuator is connected between the microphone amplifier and the transmit amplifier. The signal received by the transmit amplifier is transmitted out over the telephone line via the telephone line interface. When the speakerphone is in the receive mode, the switchable attenuator connected to the transmit amplifier is enabled, and the switchable attenuator connected to the loudspeaker amplifier is disabled to pass signals unattenuated. Conversely, when the speakerphone is in the transmit mode, the switchable attenuator connected to the loudspeaker amplifier is enabled and the switchable attenuator connected to the transmit amplifier is disabled to pass signals unattenuated.

The present invention employs a mode determination process which is implemented in a digital controller to control two-state mode switching of a speakerphone. In a two-state switching approach, the speakerphone system is either in a transmit mode or in a receive mode. There are no intermediate states between on and off in the attenuators. In such a bi-stable circuit, it is extremely important to control oscillation between modes. Such oscillation is prevented by using a hysteresis. According to a feature of the invention, hysteresis is implemented in software (i.e., appropriate programming of the controller). In an embodiment of the invention, attenuation is also implemented in software.

According to one aspect of the invention, the digital controller comprises a microprocessor.

According to another aspect of the invention, level detection is implemented by multiplexing a single analog-to-digital (A/D) converter between the transmit audio signal and the receive signal. In an embodiment of the invention, A/D conversion is implemented in the microprocessor (i.e., on-board the microprocessor chip).

According to another aspect of the invention, the level detector includes a hardware implemented peak detector.

According to another aspect of the invention, fast analog-to-digital conversion is provided for digitizing the transmit audio signal and the receive signal and providing them to the digital controller which performs attenuation in software by multiplying one of the digitized audio signals by an attenuation constant. In this case, level detection (peak detection) is accomplished by software.

According to another aspect of the invention, the level detection process includes signal compression.

According to another aspect of the invention, the compression process comprises a logarithmic conversion.

According to another aspect of the invention, the logarithmic conversion is accomplished by table lookup (i.e. by reference to a lookup table, indexed by operands).

According to another aspect of the invention, the software attenuation (e.g., multiplication) may be accomplished using table lookup.

By using hysteresis in the comparison between transmit and receive audio signal levels to determine a speakerphone mode, it becomes more difficult for the speakerphone to revert to the other mode. This use of hysteresis prevents the rapid oscillation between transmit and receive modes when the transmit audio signal level and receive signal levels are very close to one another. Hysteresis calculations are performed in software, which generally adds no significant component cost to the system.

According to another aspect of the invention, a single peak detector is multiplexed to read the peak signal values from the transmit audio signal and the receive signal in an alternating (multiplexed) manner.

By using a single peak detector considerable cost is saved over a technique which uses separated peak detectors.

By using a compression process in the level detection (e.g., logarithmic conversion using log amps), the sensitivity of the mode determination process is extended over a wider dynamic range.

The present inventive techniques achieve much of their economy by implementing the transmit/receive mode decision process, anti-howling, and prevention of rapid oscillation between modes in software, whereas the prior art techniques employ generally more costly hardware techniques. Further, the present invention accomplishes the above goals without compromising switching speed. Also, the present invention takes advantage of standard line interface and control circuitry used in standard telephones. Accordingly, minimal additional cost is required to add (retrofit) the speakerphone techniques of the present invention to a standard telephone, especially if a controlling microprocessor is already available in the telephone.

Other objects, features and advantages of the present inventions will become evident in light of the following description thereof.

BRIEF DESCRIPTION OF THE DRAWINGS

Reference will be made to preferred embodiments of the invention, examples of which are illustrated in the accompanying drawings. Although the invention will be described in the context of these preferred embodiments, it should be understood that it is not intended to limit the spirit and scope of the invention to these particular embodiments.

DETAILED DESCRIPTION OF THE INVENTION

Figure 1:
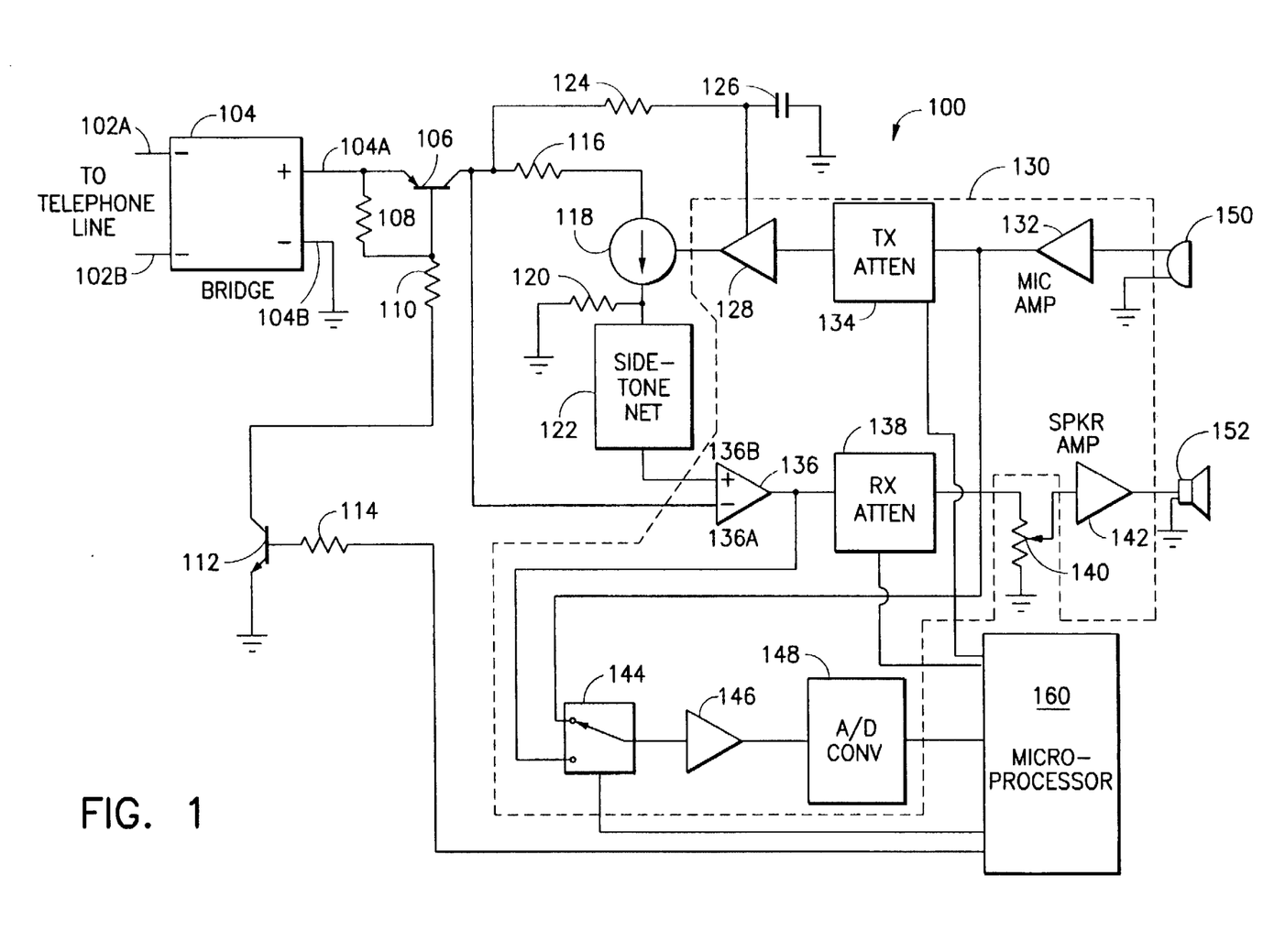
FIG. 1 is a schematic diagram of a speakerphone according to the present invention.

FIG. 1 is a schematic diagram of an embodiment of a speakerphone 100, according to the present invention. FIG. 1 uses an Application Specific Integrated Circuit (ASIC) 130 which contains most of the required hardware, and allows the use of a simple, low cost 4 or 8 bit microprocessor 160.

The device 100 is coupled to the telephone line 102A and 102B via a diode bridge 104. This serves to provide a positive polarity at its '+' output 104A regardless of the polarity of the telephone contacts 102A and 102B. The line seizure circuit (106–114) is controlled by the microprocessor 160 to connect the device 100 to the line 102A and 102B. It typically consists of a high voltage transistor 106 configured to act as a switch, three resistors 108, 110 and 114 and an NPN transistor 112.

When the line seizure circuit (106–114) is enabled by the microprocessor 160, it connects the output of the bridge 104 to the resistor 116. Resistor 116 is in turn connected to a dependent current source 118 and then to resistor 120. These three elements determine the DC load that is seen from the telephone line 102A and 102B. The current in the dependent current source 118 is adjusted by the feedback network of resistor 124 and capacitor 126 to suit varying line conditions. The transmitted audio from the transmit amplifier 128 modulates the current source 118 with the audio signal that is to be transmitted.

Incoming audio from the telephone line 102A and 102B is presented to the receive amplifier 136 at its '–' input 136A. Unfortunately, this signal also contains the transmitted audio from the transmit amplifier 128. The transmit signal is fed to the '+' input 136B of the receive amplifier 136 via the sidetone network 122. The purpose of the sidetone network 122 is to duplicate the typical phase response that is seen looking into the telephone line 102A and 102B. As a result, the receive amplifier 136 has both transmit and receive signals at its input 136A and transmit only at the '+' input 136B. To the extent that the sidetone network 122 approximates the actual line conditions, the transmit signal at both inputs 136A and 136B should be in phase. Ideally, this condition will cause the transmit signal to be cancelled, leaving only the incoming audio signal. Under actual conditions, however, the transmit signal is only attenuated by some finite amount. This attenuation is referred to as the sidetone rejection of the circuit.

The above circuitry is a typical line interface circuit that is used for normal telephones. The speakerphone circuitry described in this invention can "tap off" the telephone's line interface to provide a speakerphone function. Thus, the speakerphone feature can be added to a standard telephone at minimal additional cost, especially if a controlling microprocessor is already available.

The received audio signal is sent to a switchable attenuator 138. The switchable attenuator 138 is used to either pass the signal without change (during receive mode) or attenuate it by a fixed amount (during transmit mode). The mode, either receive or transmit, is determined by the microprocessor 160. After passing through the switchable attenuator 138, the received audio goes through a user controlled volume control 140 to the speaker amplifier 142, which drives a loudspeaker 152.

The signal from the microphone 150 is amplified by the microphone amplifier 132 and sent another switchable attenuator 134. The operation of switchable attenuator 134 is opposite to that of switchable attenuator 138. Switchable attenuator 134 will pass the signal in the transmit mode and attenuate it in receive mode. The attenuator 134 output is amplified by the transmit amplifier 128 and sent to the telephone line 102A and 102B as described above.

At the heart of the speakerphone circuit 100 is the decision-making circuitry that determines if the unit is in transmit (Tx) or receive (Rx). In order to make this decision, the microprocessor 160 must know the relative level of the signal from the telephone line 102A and 102B versus the signal from the microphone 150. In this embodiment, this task is performed through the use of a short term peak detector 146 and an A/D converter (analog-to-digital converter) 148. The short term peak detector 146 is added so that a slow, low cost A/D converter 148 can be used. The job of the short term peak detector 146 is to catch and hold the current peak of the incoming signal during the sampling period for either the receive or the transmit signal. The short term peak detector 146 could be eliminated if a faster A/D converter 148 was employed. In that case, the entire level detection function would be carried out in software.

The short term peak detector 146 and A/D converter 148 are coupled through a switch 144 to either the output of the microphone amplifier 132 or the output of the receive amplifier 136. The switch 144 is controlled by the microprocessor 160 to allow it to sample the transmit and receive signals alternately. With this information, the microprocessor 160 determines whether the unit is in receive or transmit mode according to the software described in greater detail hereinbelow with respect to FIGS. 3 and 4, and controls the attenuators 134 and 138 accordingly.

The dotted line in FIG. 1 shows the components that are likely candidates for inclusion in an Application Specific Integrated Circuit (ASIC) 130. Since the amount of additional circuitry to accomplish the speakerphone task is minimal, an ASIC 130 implementation would only cost slightly more than the circuitry for a stand alone telephone.

Several other variations of this basic idea could be implemented to suit individual circumstances. As mentioned earlier, the short term peak detector 146 could be eliminated if a faster A/D converter 148 is used. The microprocessor 160 could continuously monitor the audio signal and determine the peak level through software means. Also, if the microprocessor 160 has a built-in A/D converter, it could be used instead of the external A/D converter 148.

Figure 2:
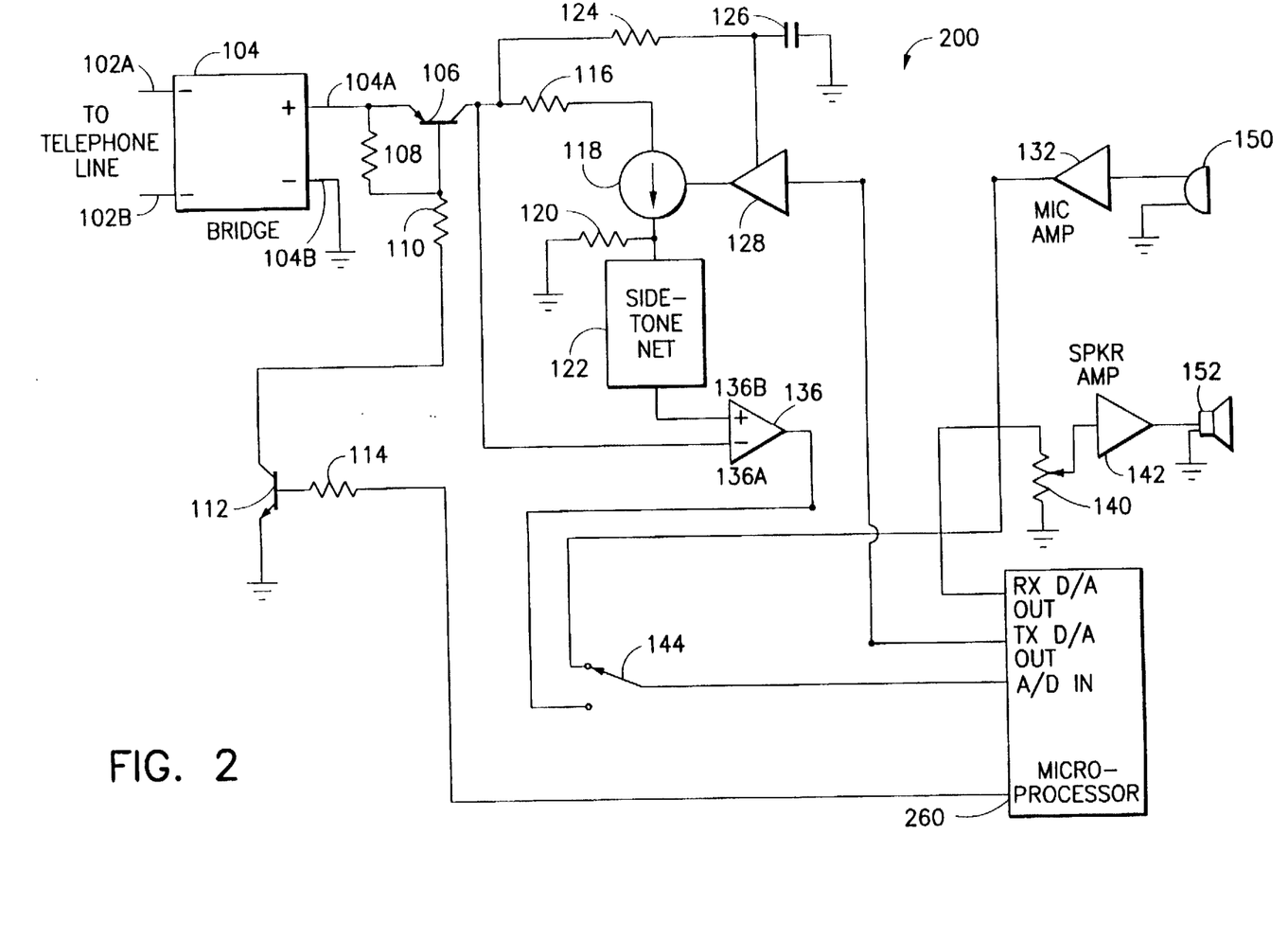
FIG. 2 is a schematic diagram of an alternate embodiment of a speakerphone according to the present invention.

It will be understood by one of ordinary skill in the art that further hardware reduction can be achieved by employing a pair of D/A converters in addition to the fast A/D converter. FIG. 2 is a schematic diagram of such an embodiment. In FIG. 2, much of the telephone interface circuitry is identical to that shown in FIG. 1. However, in FIG. 2, the microprocessor 160 of FIG. 1 is replaced with a microprocessor 260 having a built-in fast A/D converter and two D/A converters. The short term peak detector 146 of FIG. 1 has been eliminated and the entire level detection process is performed in the software of the microprocessor 260. The microprocessor 260 monitors the incoming audio signal and makes its decision as before. However, instead of controlling the attenuators (134 and 138 of FIG. 1), the attenuation is performed by dividing the digitized audio signal by a constant factor. The attenuated digitized audio signal is then fed to either the volume control 140 or the input of the transmit amplifier 128 via their respective D/A converters of microprocessor 260.

Figure 3:
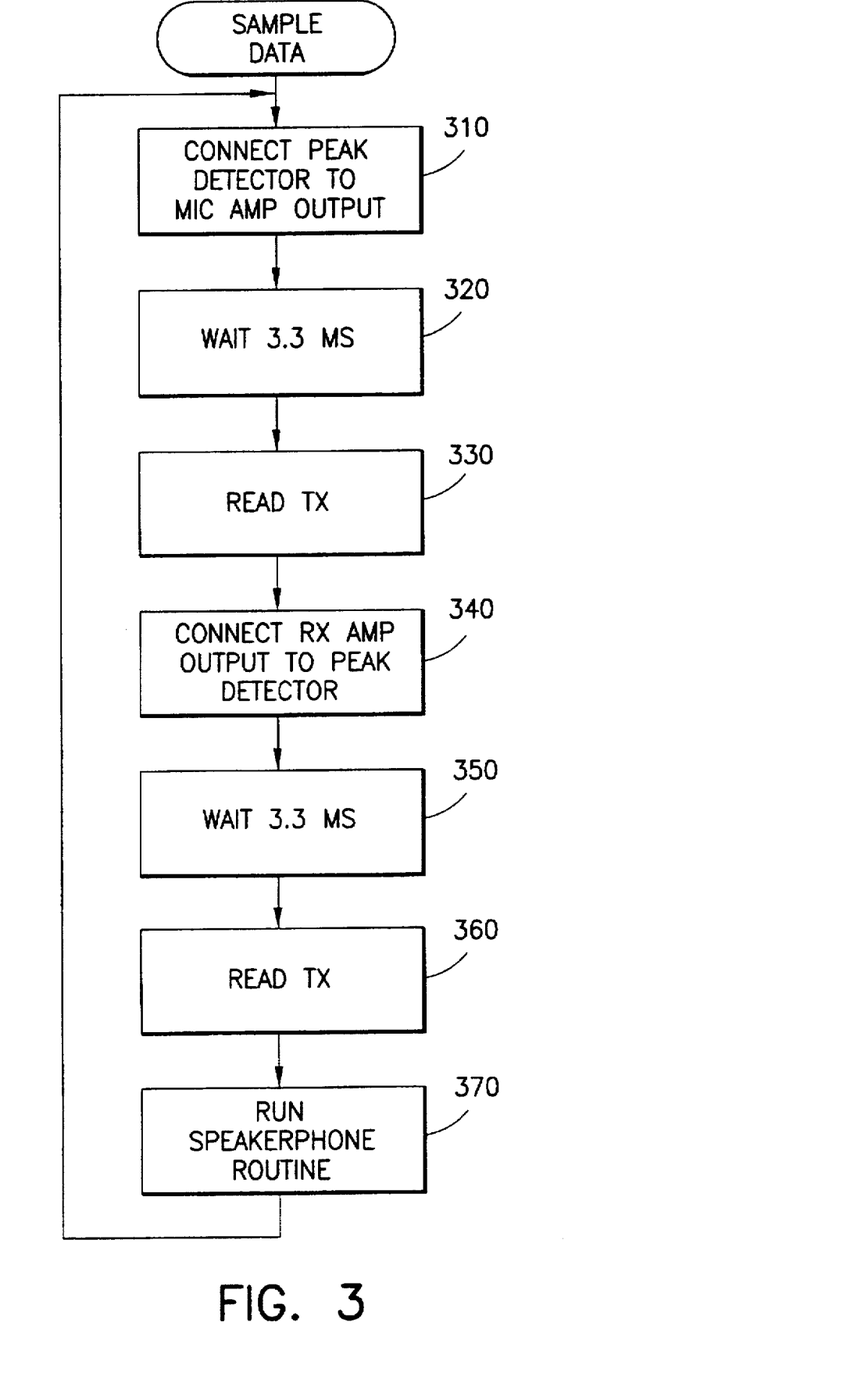
FIG. 3 is a flow chart of a data sampling process for a speakerphone according to the present invention.
Figure 4:
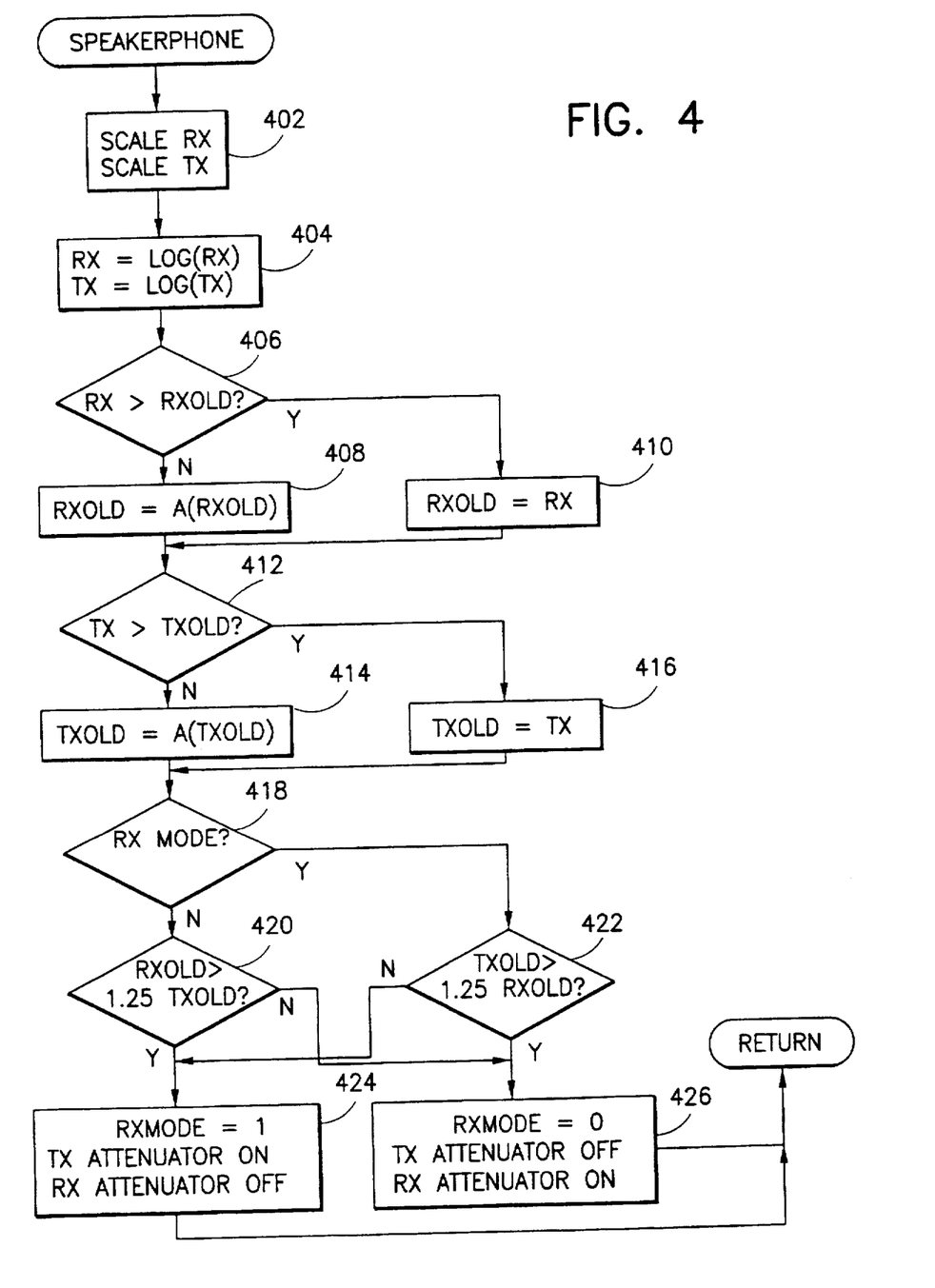
FIG. 4 is a flow chart of a decision making process according to the present invention.

The software for the microprocessor (160, 260) controlled embodiments of FIGS. 1 and 2 of the invention is shown in FIGS. 3 and 4. Initially, the microprocessor (160 in FIG. 1, 260 in FIG. 2) must sample the receive and transmit data. FIG. 3 is a flow chart illustrating the overall mode (i.e., transmit/receive) determination process. In a first step 310, the switch 144 is set to connect the microphone amplifier 132 output to the peak detector (e.g., 146 in FIG. 1). This allows the microprocessor (160, 260) to evaluate the transmit signal. In a second step 320, the microprocessor (160, 260) waits enough time for the peak detector (e.g., 146) to acquire the peak of the transmit signal. Since the lowest frequency of interest is 300 Hz, the microprocessor (160, 260) should wait approximately 3.3 milliseconds (the period of a 300 Hz signal) to ensure that the peak of the signal is seen. In a third step 330, the A/D converter (e.g., 148 in FIG. 1) is activated, its output is read, and the result is stored in the variable TX.

Continuing with FIG. 3, the receive signal is read from the receive amplifier 136 output in the same way. In a fourth step 340, the switch 144 is set to connect the receive amplifier 136 output to the peak detector (e.g., 146). This allows the microprocessor (160, 260) to evaluate the receive signal. In a fifth step 350, the microprocessor waits 3.3 milliseconds (for the same reason as before). In a sixth step 360, the peak value for the receive signal is obtained from the A/D converter (e.g., 148). This value is examined and the result is stored in the variable RX. Having obtained peak values for both the receive and transmit signals, a speakerphone mode selection process is run in a seventh step 370.

FIG. 4 is a flow chart showing the speakerphone mode selection process. In a first step 402, the receive peak value (RX) and the transmit peak value (TX) are scaled to account for any relative imbalances in the signals. The result of this scaling should provide equal values of RX and TX if typical signals are applied to the telephone line (102A, 102B) and to the microphone 150. In a second step 404, the values in RX and TX are logarithmically compressed. This is done to mitigate the effects of variations in signal level due to telephone line or acoustic conditions. The logarithm can be implemented simply by a table look up process. The receive peak value (RX) is then compared to a previous receive peak value (RXOLD) in a process step 406. The value of RXOLD was determined during the previous pass through the routine and represents the output of a level detector (i.e., a peak detector that determines the long term envelope of the signal). In both FIGS. 1 and 2, level detection is carried out in the software of the microprocessor (160, 260).

If the value of RX is greater than the value of RXOLD, a new peak has been established, and a step 410 saves the new peak value (RX) as the previous peak value (RXOLD). If the value of RX is less than the value of RXOLD, a step 408 allows RXOLD to decay exponentially. A first order exponential decay is implemented using a difference equation:

$$y(n) = A \; y(n-1)$$

where $A = e^{-T/RC}$, with T equalling the period of time between samples and RC equalling the desired time constant. In the embodiment shown in FIG. 1, T is 16 milliseconds and RC is 1 second, yielding a value of 0.98 for A. In the embodiment shown in FIG. 2, T is 0.125 milliseconds and RC is 1 second, yielding a value of 0.9999 for A.

A similar process is carried out in steps 412, 414 and 416 for the new transmit peak value (TX) and the previous transmit peak value (TXOLD). The transmit peak value (TX) is processed through a level detector in the same way as the receive peak value. The microprocessor (160, 260) uses TXOLD as the output of the level detector. In the embodiments shown in FIGS. 1 and 2, the time constant (RC) is the same for both transmit and receive signals.

In a next process step 418, the current speakerphone mode is examined. The values of RXOLD and TXOLD are compared in steps 420 and 422 to determine if the unit should change modes. Hysteresis is used to avoid oscillation problems if the receive and transmit levels are very close to one another. In step 418, the microprocessor (160, 260) checks the RXMODE flag. This flag is used to indicate the current state of the machine so that a compare with hysteresis can be done. If the speakerphone is currently in receive mode, a next process step 422 determines whether the newly saved previous transmit peak value (TXOLD) is greater than 1.25 times the newly saved received peak value (RXOLD), proceeding to a step 426 if it is greater and to a step 424 if it is not. If the current speakerphone mode is not the receive mode, then a next process step 420 determines whether the newly saved previous receive peak value (RXOLD) is greater than 1.25 times the newly saved transmit peak value (TXOLD), proceeding to step 424 if it greater and to step 426 if it is not. The step 424 sets the speakerphone in the receive mode, activates transmit attenuation and deactivates receive attenuation. The step 426 sets the speakerphone in the transmit mode, activates receive attenuation and deactivates transmit attentuation.

The net effect of the steps 418, 420, 422, 424 and 426, is to implement a significant (and selectable) amount of hysteresis into the mode selection process based upon the levels of the receive and transmit signals.

Upon completion, the mode determination process shown in FIG. 4 returns to the main mode determination loop of FIG. 3, which executes repeatedly.

Although the invention has been illustrated and described in detail in the drawings and foregoing description, the same is to be considered as illustrative and not restrictive in character—it being understood that only preferred embodiments have been shown and described, and that all changes and modifications that come within the spirit and scope of the invention, as defined in the appended claims, are to be protected.

What is claimed is:

1. A half-duplex speakerphone, comprising:

a receive amplifier for providing a receive signal from a telephone line;

a microphone amplifier for providing a transmit audio signal from a microphone;

a first switchable attenuator having a signal input, a signal output and a control input, the signal input being responsive to the receive signal, for selectively attenuating or passing the receive signal based on a state of a first control signal at the control input of the first switchable attenuator;

a second switchable attenuator having a signal input, a signal output and a control input, the signal input being responsive to the transmit audio signal, for selectively attenuating or passing the transmit audio signal based on a state of a second control signal at the control input of the second switchable attenuator;

a multiplexed detector having an output port, the multiplexed detector alternately detecting a level of one of the receive signal and a level of the transmit audio signal; and a digital controller coupled to said output port of the multiplexed detector, for providing the first and second control signals to said control inputs of said first and second switchable attenuators, to activate only one of said first and second switchable attenuators at a time based on the detected levels of the receive signal and the transmit audio signal.

2. A speakerphone according to claim 1, wherein said digital controller comprises a microprocessor.

3. A speakerphone according to claim 1, further comprising:

an analog-to-digital converter connected between the multiplexed detector and the digital controller.

4. A half-duplex speakerphone system, comprising:

a receive amplifier for providing a receive signal from a telephone line;

a microphone amplifier for providing a transmit audio signal from a microphone;

a digital controller;

a first digital-to-analog converter operatively coupled to said digital controller for providing a loudspeaker signal to a loudspeaker amplifier;

a second digital-to-analog converter operatively coupled to said digital controller for providing the transmit audio signal to a telephone line interface; and a multiplexed analog-to-digital converter, having a single output port, for converting the transmit audio signal and the receive signal to digital form, and for providing the digitally converted transmit audio signal and receive audio signal at the single output port to the digital controller, wherein the digital controller provides the digitized transmit audio signal to the second digital-to-analog converter and provides the digitized receive signal to the first digital-to-analog converter.

5. A speakerphone system according to claim 4, wherein said digital controller comprises a microprocessor.

6. A speakerphone system according to claim 4, further comprising:

a multiplexer providing the transmit audio signal and the receive signal to the analog-to-digital converter; and wherein:

said digital controller controls operation of the multiplexer and of the analog-to-digital converter in a rapid alternating sequence to take alternating samples of data from the transmit audio signal and the receive signal.

7. A speakerphone system according to claim 4, wherein the digital controller selectively digitally attenuates the transmit audio signal and the receive signal before sending the selectively digitally attenuated transmit audio signal to the second digital-to-analog converter and sending the selectively digitally attenuated receive signal to the first digital-to-analog converter.

8. A speakerphone system according to claim 7, wherein the digital controller performs the digital attenuation by multiplying converted data from the analog-to-digital converter by a constant value.

9. A speakerphone system according to claim 4, wherein the digital controller comprises:

a digital peak detector for sampling the digitized transmit audio signal and the digitized receive signal and providing first and second digital peak detector output signals; and at least one digital attenuator for selectively digitally attenuating the transmit audio signal and the receive signal;

and wherein the first and second outputs of the digital peak detector are compared to one another to determine the amount of attenuation applied to the transmit audio signal and the receive signal by the at least one digital attenuator.

10. A speakerphone system according to claim 9, wherein the digital controller performs the digital attenuation by multiplying converted data from the analog-to-digital converter by a constant value.

11. A software method of operating a half-duplex speakerphone in only one of a transmit mode of operation and a receive mode of operation, the method comprising:

digitally sampling a transmit audio signal provided by a microphone amplifier;

digitally sampling a receive signal provided by a receive amplifier;

selectively enabling, under software control, a first switchable attenuator to attenuate the receive signal in said transmit mode of operation, the transmit signal being passed to an output port in said transmit mode of operation; and selectively enabling, under software control, a second switchable attenuator to attenuate the transmit signal in said receive mode of operation, the receive signal being passed to a receive device in said receive mode of operation;

wherein the selectively enabling steps are performed based on a comparison of the digitally sampled transmit and receive signals; and wherein if the first switchable attenuator is enabled, the second switchable attenuator is disabled so as to pass the transmit signal, and if the second switchable attenuator is enabled, the first switchable attenuator is disabled so as to sass the receive signal.

12. A method according to claim 11, further comprising:
imposing hysteresis in a determination of the mode of operation of the speakerphone.

13. Method, according to claim 11, further comprising:
implementing a fixed degree of attenuation in the switchable attenuators.

14. The method according to claim 11, further comprising digitally compressing the transmit audio signal and the receive signal.

15. The method according to claim 11, further comprising:
providing automatic gain control for the receive signal.

16. A half-duplex speakerphone system, comprising:
a receive amplifier for amplifying signals received from a telephone line and for providing signals received from the telephone line to a loudspeaker, the receive amplifier having an output port for providing an output signal;

a microphone amplifier for amplifying signals from a microphone and for providing the signals from the microphone to the telephone line, the microphone amplifier having an output port for providing an output signal;

a first switchable attenuator operatively coupled to the output port of the receive amplifier for attenuating the output signal of the receive amplifier based on a first control input;

a second switchable attenuator operatively coupled to the output of the microphone amplifier for attenuating the output signal of the microphone amplifier based on a second control input;

at least one detector, for detecting levels of signals at the output of the microphone amplifier and at an output of the receive amplifier; and a controller receiving an output of the at least one detector and being responsive thereto to selectively enable only one of the first and second switchable attenuators based on a comparison of the levels of the signals provided by the at least one detector.

17. A speakerphone system according to claim 16, wherein said controller comprises a microprocessor.

18. A speakerphone system according to claim 17, wherein said at least one detector further comprises:
a single peak detector;

a switch selectively providing either the output of the microphone amplifier or the output of the receive amplifier to the single peak detector, in response to an output of the microprocessor; and an analog-to-digital converter connected to an output of the single peak detector.

19. A speakerphone system according to claim 17, wherein the at least one detector comprises:
two peak detectors; and
two analog-to-digital converters, each connected to an output of a respective one of the two peak detectors.

20. A speakerphone system according to claim 17, wherein the at least one detector comprises:
a multiplexer having inputs coupled to the output of the microphone amplifier and the output of the receive amplifier;

an analog-to-digital converter coupled to an output of said multiplexer; and a digital peak detector;

whereby, said microprocessor causes said multiplexer to select one input at a time, thereby allowing said microprocessor to sequentially determine said microphone and said telephone line signal levels.

21. A speakerphone system according to claim 20, wherein:
inputs of said first and second switchable attenuators are coupled to outputs of said analog-to-digital converter; and each of said switchable attenuator means comprising:
a digital scaling circuit; and
a digital-to-analog converter coupled to the scaling circuit.

22. A speakerphone system according to claim 13, wherein:
said at least one detector comprises two detectors, said two detectors having outputs which are compared against a current output state of said microprocessor.

23. A speakerphone system according to claim 17, wherein:
the receive amplifier, the transmit amplifier, the first and second switchable attenuators, and the at least one detector are implemented on a single integrated circuit.

24. A speakerphone system according to claim 17, further comprising:
a first compression unit for compressing a dynamic range of a receive signal; and a second compression unit for compressing a dynamic range of a signal from said microphone amplifier.

25. A speakerphone system according to claim 24, wherein:
both of said first and second compression units employ a logarithmic compression function.

26. A speakerphone system according to claim 24, wherein:

both of said first and second compression units use lookup tables.

27. A speakerphone system according to claim 17, further comprising:

a line driver; and cancellation means coupled between said line driver and said receive amplifier for cancelling a sidetone signal from said line driver via said telephone line.

28. A speakerphone system according to claim 27, wherein:

a maximum attenuation of said first switchable attenuator is reduced by an amount corresponding to an amount of sidetone rejection of said cancellation means.

29. A speakerphone system according to claim 17, further comprising:

an automatic gain control circuit, employed in the receive mode, to maintain a substantially constant level of signals at said loudspeaker regardless of telephone line conditions.

30. A speakerphone system according to claim 16, wherein the at least one detector comprises:

a single peak detector;

a switch selectively providing either the output of the microphone amplifier or the output of the receive amplifier to the single peak detector, in response to an output of the controller; and an analog-to-digital converter connected to an output of the single peak detector.

31. A speakerphone system, according to claim 16, wherein the at least one detector comprises:

two peak detectors; and two analog-to-digital converters, each connected to an output of a respective one of the two peak detectors.

32. A speakerphone system according to claim 16, wherein the at least one detector comprises:

a multiplexer having inputs coupled to the output of the microphone amplifier and the output of the receive amplifier;

an analog-to-digital converter coupled to an output of said multiplexer; and a digital peak detector;

whereby, said controller causes said multiplexer to select one input at a time, thereby allowing said controller to sequentially determine said microphone and said telephone line signal levels.

33. A speakerphone system according to claim 32, wherein:

inputs of said first and second switchable attenuators are coupled to outputs of said analog-to-digital converter; and each of said switchable attenuators comprises:

a digital scaling circuit; and a digital-to-analog converter coupled to the scaling circuit.

34. A speakerphone system according to claim 16, wherein:

said at least one detector comprises two detectors, said two detectors having outputs which are compared against a current output state of said controller.

35. A speakerphone system according to claim 16, wherein:

the receive amplifier, the microphone amplifier, the first and second switchable attenuators, and the at least one detector are implemented on a single integrated circuit.

36. A speakerphone system according to claim 16, further comprising:

a first compression unit for compressing a dynamic range of a receive signal; and a second compression unit for compressing a dynamic range of a signal from said microphone amplifier.

37. A speakerphone system according to claim 36, wherein:

both of said first and second compression units employ a logarithmic compression function.

38. A speakerphone system according to claim 36, wherein:

both of said first and second compression units use lookup tables.

39. A speakerphone system according to claim 16, further comprising:

a line driver; and cancellation means coupled between said line driver and said receive amplifier for cancelling a sidetone signal from said line driver via said telephone line.

40. A speakerphone system according to claim 39, wherein:

a maximum attenuation of said first switchable attenuator is reduced by an amount corresponding to an amount of sidetone rejection of said cancellation means.

41. A speakerphone system according to claim 16, further comprising:

an automatic gain control circuit, employed in the receive mode, to maintain a substantially constant level of signals at said loudspeaker regardless of telephone line conditions.

* * * * *